US006690727B1

(12) United States Patent
Mehta

(10) Patent No.: US 6,690,727 B1
(45) Date of Patent: Feb. 10, 2004

(54) IMAGE PROCESSING

(75) Inventor: Kalpesh Mehta, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/566,623

(22) Filed: May 8, 2000

(51) Int. Cl.$^7$ .................... H04B 1/66; H04N 7/12; G06K 9/36
(52) U.S. Cl. ............... 375/240.12; 382/238; 348/402.1; 348/420.1
(58) Field of Search .................. 375/240.12, 240.16, 375/240.17, 240.24, 240.13; 348/402.1, 413.1, 416.1, 420.1, 699, 714, 715; 382/236

(56) References Cited

U.S. PATENT DOCUMENTS 5,247,355 A * 9/1993 Frederiksen ........... 375/240.12
5,901,248 A * 5/1999 Fandrianto et al. ......... 382/236
6,441,842 B1 * 8/2002 Fandrianto et al. ...... 348/14.13

* cited by examiner

*Primary Examiner*—Gims Philippe
(74) *Attorney, Agent, or Firm*—Fish & Richardson P.C.

(57) ABSTRACT

Image processing includes storing N groups of pixels in respective memory banks, each group containing M pixel blocks of a first image and determining matches for two different pixel blocks in a second image that is temporally adjacent to the first image by using the groups of pixel blocks stored in the memory banks.

19 Claims, 5 Drawing Sheets

IMAGE PROCESSING

BACKGROUND

This invention relates to image processing.

Image compression techniques such as MPEG (moving pictures experts group) use motion estimation in coding images. As shown in FIG. 1, motion estimation approximates the pixels in a current frame 10 of a video or graphics image based on the pixels in a previous frame 12. Specifically, motion estimation using block matching algorithms can take advantage of the temporal redundancy between successive frames of video or graphics images. Block matching algorithms search a region of an image frame called a search window 18 to determine the movement of a portion of an image such as a leaf 13 that is within a current block of pixels 14 from one frame 12 to the next 10. The search window 18 typically includes the pixels in the previous frame 12 that surround the location that corresponds to the location of the current block of pixels 14 in the current frame 10 because these surrounding pixels are more likely than other pixels in the previous frame 12 to include a matching block of pixels 15 for the current block of pixels 14. A motion vector 16 represents the direction and amount of movement of the matching block of pixels 15 from the previous frame 12 and in that way implies the direction and amount of motion that will occur between the previous frame 12 and the current frame 10. Here the motion vector 16 shows that the matching block of pixels 15 is in an area above and to the right of the location corresponding to the location of the current block of pixels 14 in the current image 10, indicating that the leaf 13 is falling down and to the left. In this way, less storage space and bandwidth are used in transmitting a given pixel block because only the motion vector for the pixel block need be transmitted rather than the pixel block itself.

FIG. 2 shows that when the search windows 20a–b for different pixel blocks 22a–b overlap, block matching algorithms read some pixels more than once, such as the pixels in the shaded region.

DESCRIPTION

One way to avoid reading pixel blocks more than once while performing block matching in a motion estimation algorithm is to effectively use the overlapping regions of search windows associated with successive current pixel blocks. Storing pixel blocks from the prior frame and/or from the succeeding frame and comparing them with each of the next n (an integer) successive current pixel blocks saves memory and bandwidth over repeatedly fetching the same pixel blocks from the prior frame and/or from the succeeding frame for comparison with different current pixel blocks.

Figure 1:
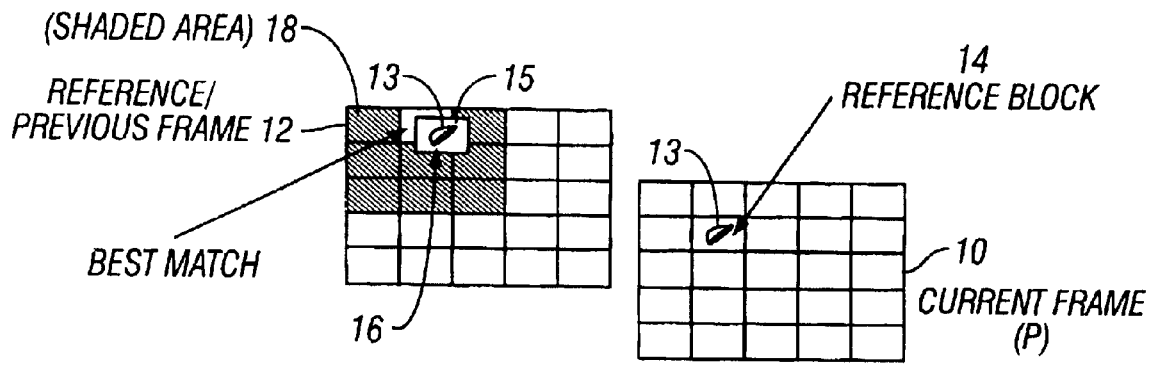
FIG. 1 (PRIOR ART) is a diagram showing images for use in motion estimation.
Figure 2:
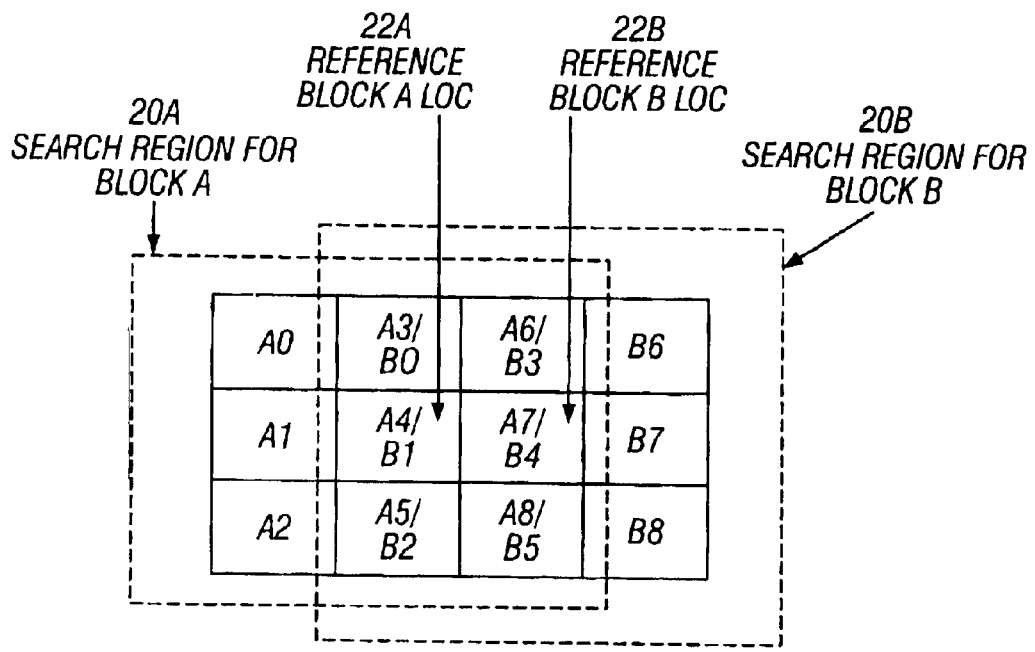
FIG. 2 (PRIOR ART) is a diagram showing pixel blocks in an image and search windows for the pixel blocks.
Figure 3:
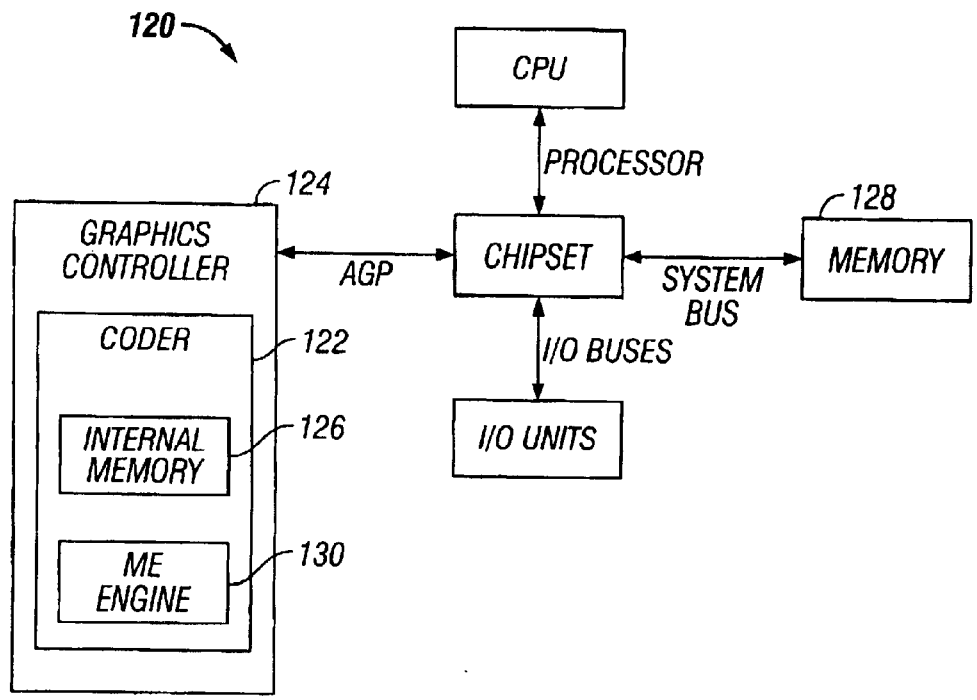
FIG. 3 is a block diagram of a computer system.

Referring to FIG. 3, a system 120 for motion estimation includes a coder 122 in a graphics controller 124 that may include an internal memory system 126, described further below with reference to FIGS. 5 and 10. The internal memory system 126 stores reference pixel blocks fetched from external memory 128, e.g., synchronous dynamic random access memory (SDRAM). In this way, a motion estimation engine 130 included in the coder 122 can estimate the motion of a current pixel block from a previous frame to a current frame. Of course, the motion estimation engine 130 could also estimate the motion of the current pixel block from a frame succeeding the current frame instead of or in addition to the previous frame.

Figure 4:
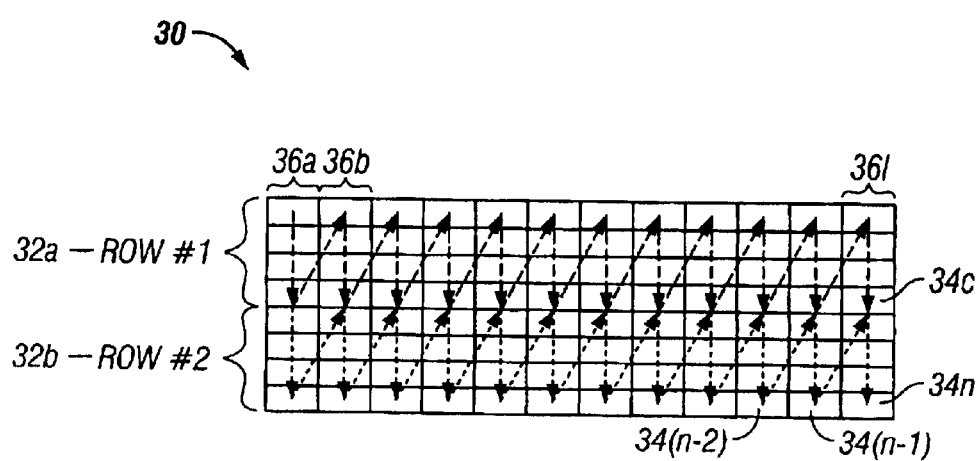
FIG. 4 is a diagram showing an image divided into pixel blocks.

Referring to FIG. 4, the motion estimation engine 130 (FIG. 3) scans and stores 8×8 (eight pixels by eight pixels) reference pixel blocks 34a–n in a reference image 30. The reference image 30 is divided into rows 32a–b, each of the rows 32a–b being four pixel blocks 34 high. Rows may contain more or less than four pixel blocks 34, depending on the size of internal memory as described below. The pixel blocks 34a–n are scanned vertically within a row 32a–b starting at a first pixel block 34a in a first column 36a and then as indicated by the dotted arrows. Accessing the pixel blocks vertically helps to reduce page thrashing in a tiled external memory, e.g., SDRAM, and to reduce the bandwidth to memory by reusing pixel blocks. As each column 36a–l is read within a row 32a–b, the column is stored in internal memory 126 (FIG. 3). When the end of the top row 32a is reached at a last pixel block 34c in a last column 36l, the next row 32b is scanned and stored, as explained for the top row 32a, starting at a first pixel block 34b in the first column 36a.

Figure 5:
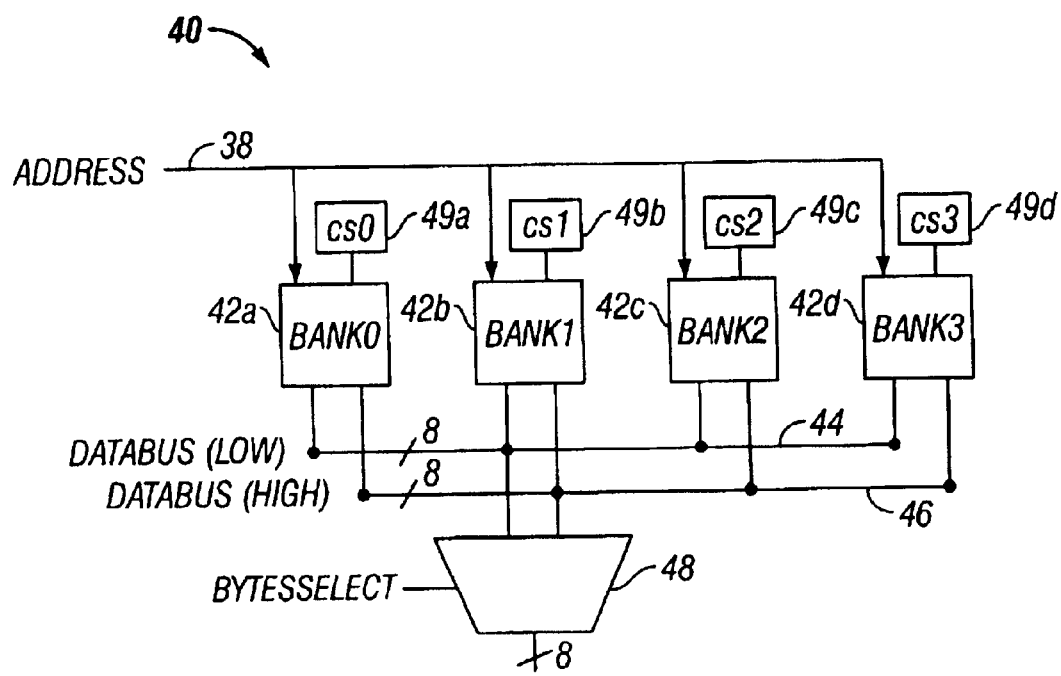
FIG. 5 is a block diagram of an internal memory system in accordance with an embodiment of the invention.

Referring to FIG. 5, columns of 8×8 pixel blocks (as described above with reference to FIG. 4) are stored in an internal memory system 40 for comparison with a current pixel block. Each column of pixel blocks is stored in a corresponding memory bank 42a–d. All but one of the memory banks 42a–d are used at any given time; the remaining memory bank 42 pre-fetches data for the next set of pixel blocks. Though the internal memory system 40 includes four memory banks 42a–d, it could include more or less depending on the size of the pixel blocks and the search window as described further below.

Each memory bank 42a–d is an eight-byte wide one-port memory unit. A motion estimation engine 130 (FIG. 3) determines the appropriate width of each memory bank 42a–d by assuming that the motion estimation engine 130 has a number of processing units for computing the distortion functions (the functions that determine a match for the current pixel block) equal in number to one row (eight pixels) of the reference pixel block. The size of each memory bank 42a–d thus equals:

Size=(Pixel Blocks per row+2)×(Rows of Pixels)×(Columns of Pixels), which here equals 384 bytes. The "2" in the above equation takes into account the search window region lying above and below the current pixel block, given an [−8, +8] search window region.

Figure 6:
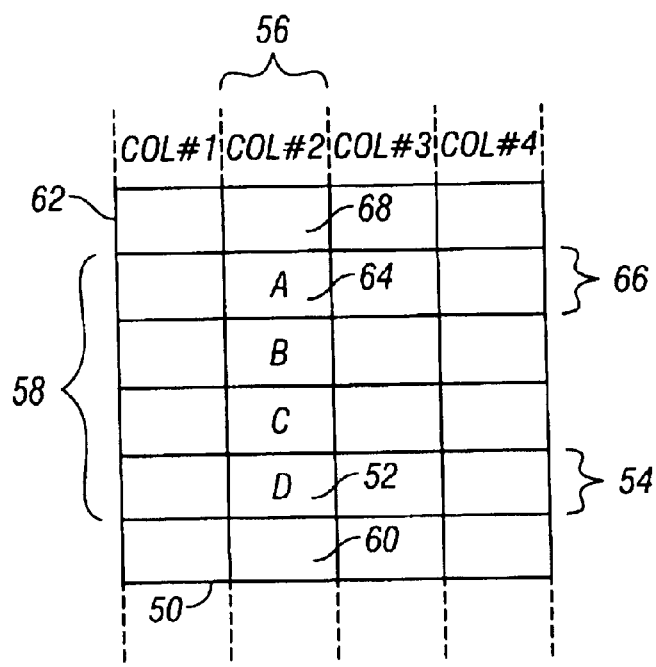
FIG. 6 is a diagram showing pixel blocks in an image and search windows for the pixel blocks.

Referring to FIG. 6, the inclusion of the lower and upper pixel blocks 60, 68 in the bottom and top search windows 50, 62 explains the inclusion of the "2" in the above equation. A bottom search window 50 for a bottom current pixel block 52 in a bottom row 54 of a stored column 56 in a row 58 includes a lower pixel block 60 which lies outside of the row 58. Similarly, a top search window 62 for a top current pixel block 64 in a top row 66 of the stored column 56 in the row 58 includes an upper pixel block 68 which lies outside of the row 58.

Figure 7:
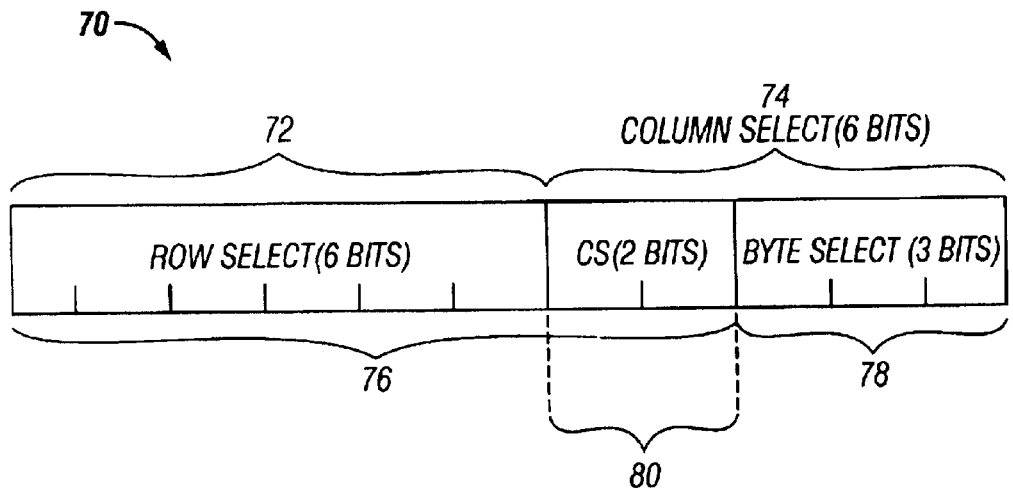
FIG. 7 is a block diagram of an address.

Referring to FIGS. 5 and 7, an address 70 sent to the memory banks 42a–d by the motion estimation engine along an address bus 38 indicates the start address of the search window for the current pixel block. The configuration of the address 70 simplifies the accessing of the stored pixel block data for comparison with the current pixel block. The address 70 includes a row select section 72 and a column address section 74. The row select section 72 includes the five most significant bits (MSB) of the address 70 and corresponds to the row location of the search window. A column select section 82 includes the six least significant bits (LSB) of the address 70 and corresponds to the column location of the search window. Since the search window is twenty-four bytes wide (an eight-byte wide current pixel block and eight bytes on either side of it), the column select section 72 does not include the entire column address range of the search window. Instead, only a raw address 76, the eight MSB of the address 70, are used to access the memory banks 42a–d while a byte select section 78, the three LSB, are used in selecting the pixel block requested by the motion estimation engine as described further below.

Each memory bank 42a–d takes the raw address 76 and evaluates whether the column of data stored in that memory bank 42a–d falls within the search window indicated by the address 70. If the raw address 76 falls within the address range of the column of data stored in a memory bank 42a–d, the matching data in the memory bank 42a–d is driven out on an eight-byte wide lower data bus 44. Each memory bank 42a–d also increments the raw address 76 by one. If this incremented raw address falls within the address range of the column data stored in a memory bank 42a–d, the matching data in the memory bank 42a–d is driven out on an eight-byte wide upper data bus 46.

The row select section 72 indicates the row desired by the motion estimation engine, and a column select section 74 of the address 70 (and raw address 76) indicates the desired columns. Incrementing the raw address 76 by one effectively adds one to a chip select section 80. The value in the chip select section 80 matches one of four chip select registers 49a–d included in the internal memory system 40 and associated with each of the memory banks 42a–d. The values of the chip select registers 49a–d are initialized at the beginning of each row, e.g., rows 32a–b in FIG. 4, to zero, one, two, and three, respectively. The chip select registers 49a–d are arranged in a rotating shift register chain. After processing four current pixel blocks, the chip select registers 49a–d are shifted by one so that the motion estimation engine can begin processing on the next four pixel blocks. The memory bank 42a–d associated with the chip select register 49a–d having a value of three is not accessed for reading; it instead prefetches the next pixel block. Because only one chip select register 49a–d can match a given chip select section 80, only one memory bank 42a–d can include matching data for each of the raw address 76 and the incremented raw address. Thus, for every address 70 sent to the memory banks 42a–d, two memory banks 42a–d will respond, one driving the lower data bus 44 and another driving the upper data bus 46.

Figure 8:
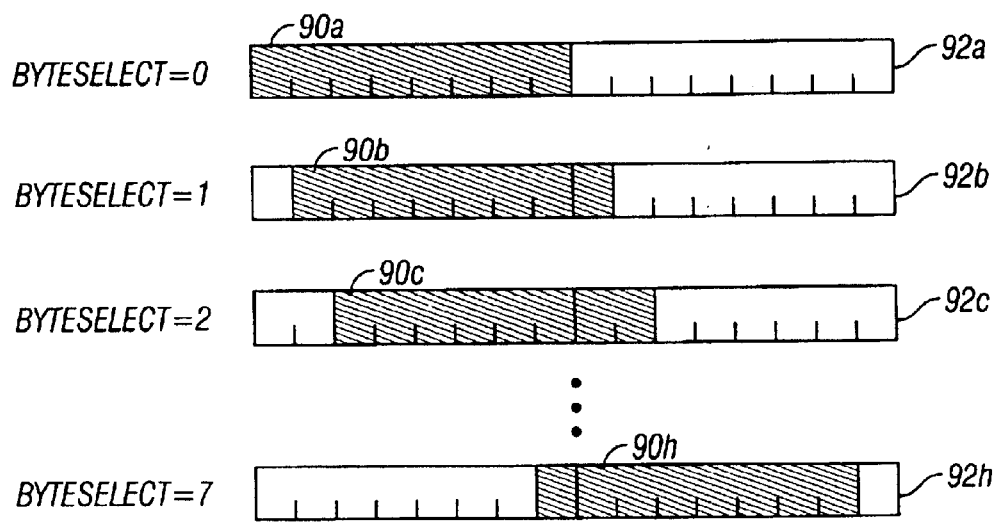
FIG. 8 is a diagram showing multiplexor logic.

Also referring to FIG. 8, a multiplexor 48 selects eight bytes 90 to send to the motion estimation engine from the sixteen bytes 92 input to it on the lower data bus 44 and the upper data bus 46. The byte select section 78 of the address 70 informs the multiplexor 48 which of the eight bytes 92 to select. The byte select section 78 ranges in value from zero ("000") to seven ("111"). When the byte select section 78 equals zero, the selected eight bytes 90a are the right-most bytes of the sixteen bytes 92a. Each increment of the byte select section 78 causes the multiplexor 48 to select the eight bytes 90 one byte to the right from the previously selected eight bytes 90. Using this methodology accounts for the motion estimation engine sliding the current pixel block across the search window in one pixel increments in computing the distortion criteria.

Figure 9:
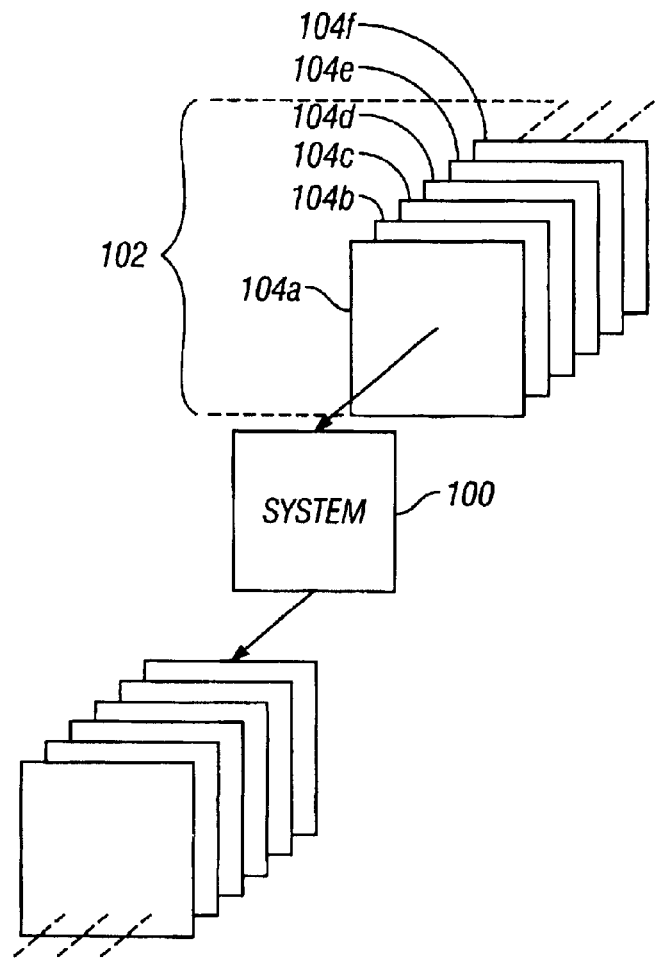
FIG. 9 is a diagram showing a succession of images.

Referring to FIG. 9, a system 100 including the internal memory system 40 (see FIG. 5) can accommodate an incoming sequence 102 of 1920×1080 (interlaced) high definition television (HDTV) images 104a–n at twenty-four frames per second (fps). Each image 104a–n in the incoming sequence 102 is 240 pixel blocks wide and 135 pixel blocks tall, each pixel block being 8×8. Thus, each image 104a–n includes thirty-four rows of four pixel blocks each. The memory bandwidth required for the internal memory system 40 to process one row of data equals approximately 90 kB (6 blocks/row×240 columns×64 B/block), with 3 MB required to process all thirty-four rows. Thus, the overall bandwidth required is 72 MB/s (3 MB/frame×24 frames/s).

Figure 10:
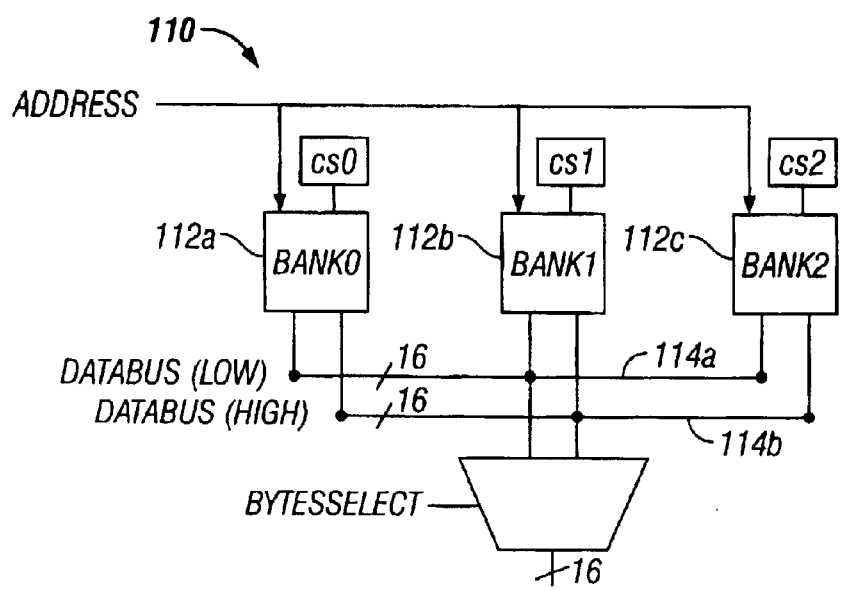
FIG. 10 is a block diagram of an internal memory system in accordance with an embodiment of the invention.

Referring to FIG. 10, the concept of effectively using the overlapping regions of search windows for successive current pixel blocks can be extended to various block and search window sizes. For example, an internal memory system 110 is configured to process 16×16 pixel blocks for a [−8, +8] search window region. The internal memory system 110 includes three memory banks 112a–c and two sixteen-byte data buses 114a–b.

Other embodiments are within the scope of the following claims.

What is claimed is:

1. A method comprising:
obtaining and storing, from a first image, N groups of pixels in respective memory banks, each group containing M pixel blocks of a first image; and
determining matches for two different pixel blocks in a second image that is temporally adjacent to the first image, by using the same groups of pixel blocks stored in the memory banks to match to both of said two different pixel blocks.

2. The method of claim 1 further comprising determining matches for up to I additional pixel blocks in the second image from among the groups of pixel blocks stored in the memory banks.

3. The method of claim 1 in which the M pixel blocks are vertically contiguous.

4. The method of claim 1 in which N equals one plus a number of columns in a search window defined by the pixel block in the second image.

5. The method of claim 1 in which M equals a number that when multiplied by a number of pixels in each pixel block plus two allows the group of M pixel blocks to fit in the memory bank.

6. The method of claim 1 in which the first and second images are images in a sequence of video images.

7. The method of claim 1 in which the matches approximate the motion of the pixel blocks in the second image from the first image to the second image or in the first image from the second image to the first image.

8. An article comprising a storage medium for storing computer-executable instructions, the instructions causing a computer to:

obtain and store, from a first image, N groups of pixels in respective memory banks, each group containing M pixel blocks of a first image; and determine matches for two different pixel blocks in a second image that is temporally adjacent to the first image, by using the same groups of pixel blocks stored in the memory banks to match to both of said two different pixel blocks.

9. The article of claim 8 further causing a computer to determine matches for up to I additional pixel blocks in the second image from among the groups of pixel blocks stored in the memory banks.

10. The article of claim 8 in which the M pixel blocks are vertically contiguous.

11. The article of claim 8 in which N equals one plus a number of columns in a search window defined by the pixel block in the second image.

12. The article of claim 8 in which M equals a number that when multiplied by a number of pixels in each pixel block plus two allows the group of M pixel blocks to fit in the memory bank.

13. The article of claim 8 in which the first and second images are images in a sequence of video images.

14. The article of claim 8 in which the matches approximate the motion of the pixel blocks in the second image from the first image to the second image or in the first image from the second image to the first image.

15. A method comprising:

receiving a succession of related images containing pixels; and estimating the motion of two first and second, different, current pixel blocks in a first image in the succession of related images from a second image that is temporally adjacent to the first image in the succession of related images by comparing both of the two current pixel blocks with the same stored pixel blocks from the second image, stored in internal memory.

16. The method of claim 15 further comprising estimating the motion of one or more pixel blocks in the first image that are contiguous to the current pixel blocks with the pixel blocks from the second image stored in internal memory.

17. The method of claim 15 further comprising storing the pixel blocks in the second image in memory banks included in internal memory.

18. The method of claim 15 further comprising dividing the second image into X rows of Y rows each.

19. The method of claim 18 further comprising storing single columns of Y pixel blocks in each row in the memory banks starting with the first of the X rows and moving from left to right.

* * * * *